Sept. 28, 1948.  A. C. NELSON  2,450,292
SOLE EDGE TRIMMER
Filed Aug. 27, 1946
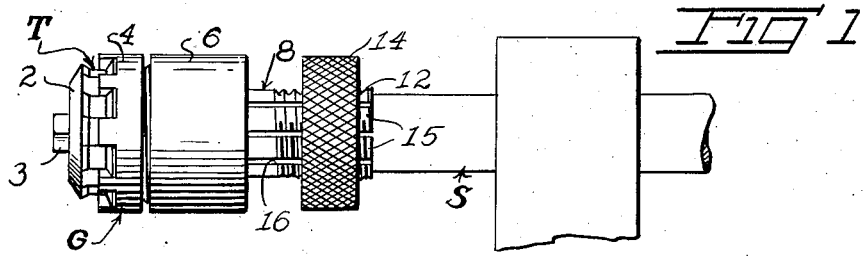
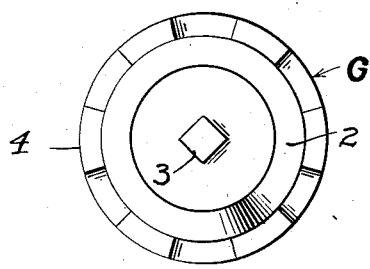
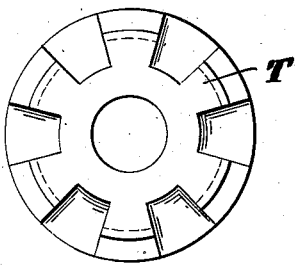
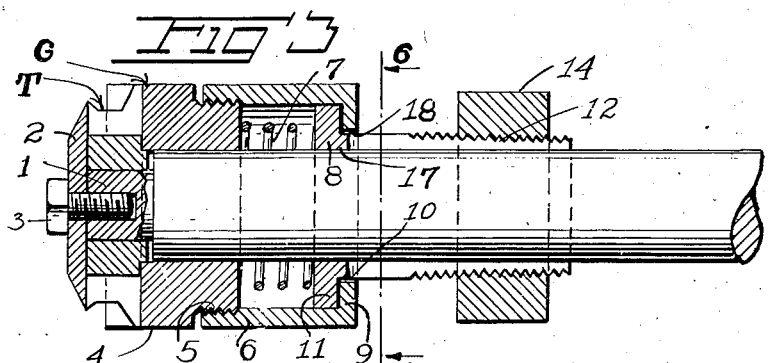
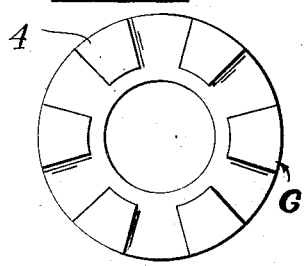
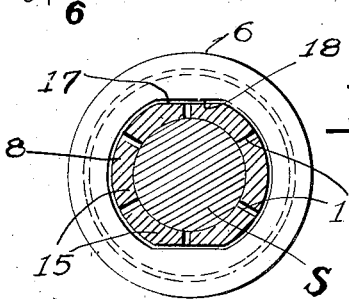
Inventor
*Arthur C. Nelson*
By *Wilfred E. Lawson*
Attorney Patented Sept. 28, 1948

2,450,292

UNITED STATES PATENT OFFICE 2,450,292

SOLE EDGE TRIMMER

Arthur C. Nelson, Alexandria, Minn.

Application August 27, 1946, Serial No. 693,229

5 Claims. (Cl. 12—92)

This invention relates to sole edge trimmers for shoe soles and has relation more particularly to a tool of this kind for use on shoe finishing machines, and it is primarily an object of the invention to provide a tool of this kind including a trimming guard mounted on the trimmer shaft in a manner whereby the guard may be readily adjusted with respect to the trimmer or cutter without requiring the use of tools for either releasing or tightening the trimmer guard when an adjustment is desired to be made.

It is also an object of the invention to provide an edge trimmer with a trimmer guard which can be quickly and easily adjusted for any size trimmer or cutter by the use only of the digits of a hand and thus eliminate the necessity of employing tools as is now the general practice.

Furthermore it is an object of the invention to proivde an edge trimmer which can be employed with equal advantage on the standard trimmer shafts of most types of shoe finishing machines now on the market without requiring any structural changes being made in the trimmer tool and, furthermore, wherein the securement of the trimmer or cutter on the trimmer shaft is such as to substantially eliminate disarrangement which would be liable to occur if a set screw or the like was employed for locking the trimmer to its shaft.

The invention consists in the details of construction and in the combination and arrangement of the several parts of my improved machine tool whereby certain important advantages are attained, as will hereinafter be more fully set forth.

In order that my invention may be better understood, I will now proceed to describe the same with reference to the accompanying drawings, wherein:

Figure 1 is a view in side elevation illustrating an edge trimmer tool constructed in accordance with an embodiment of the invention and in applied position;

Figure 2 is a view in front elevation of the tool as illustrated in Figure 1;

Figure 3 is a longitudinal sectional view taken through the tool as illustrated in Figure 1, with parts in elevation;

Figure 4 is a view in rear elevation of the trimmer as herein embodied, unapplied;

Figure 5 is a view in front elevation of the tool, unapplied, with the trimmer omitted; and Figure 6 is a sectional view taken substantially on the line 6—6 of Figure 3.

In the embodiment of the invention as illustrated in the accompanying drawings, S denotes a standard trimmer shaft of a shoe finishing machine having its outer end portion 1 reduced in diameter to provide a mounting for the desired trimmer or cutter T, held to the mounting 1 by the guard 2 secured to the outer end of the shaft S or more particularly the mounting 1, by the screw 3.

The trimmer guard G comprises the guard member 4 of a generally well known type for co-acting in the usual way with the trimmer or cutter T. This member 4 freely surrounds the outer portion of the shaft S and has its rear portion provided with the peripheral threads 5, so that said portion may be readily threaded into the forward part of the spring chamber sleeve 6 which houses the expansible coil spring 7 surrounding the shaft S and interposed between and bearing against the opposed ends of the guard member 4 and the holding sleeve 8. This spring 7 operates to normally maintain the guard member 4 at the limit of its outer movement toward the trimmer or cutter T.

The inner end of the sleeve 6 is defined by an inwardly disposed continuous flange 9 defining a central opening 10 through which freely passes the inner portion of the holding sleeve 8. The extremity of the sleeve 8 within the sleeve 6 is provided with an outstanding surrounding flange 11 which coacts with the flange 9 to positively limit the extent of outward movement of the guard member 4 with respect to the sleeve 8.

The sleeve 8 is outwardly and downwardly tapered with its outer end portion provided with the peripheral threads 12 with which engages the clamping nut 14. This nut 14 is of such size to be readily turned as desired by the hand of a person, thus eliminating the use of any operating tool.

The outer portion of the sleeve 8 is divided into elongated segment arms 15 by the longitudinally disposed slots 16 so that as the nut 14 is turned to move inwardly of the sleeve 8, the arms 15 will be forced into tight clamping engagement with the shaft S and thus hold the guard member 4 in desired selected adjustment with respect to the trimmer or cutter T as may be determined or required by the size of such trimmer or cutter or for any purpose necessitated by the requirements of practice. When it is desired to shift the guard 4 from one position to another or to remove the same from the shaft S, it is only necessary to turn the nut 14 in a direction to move the same outwardly of the sleeve 8 a distance sufficient to release the clamping or holding action of the arms upon the shaft S.

The inner portion of the holding sleeve 8, or that portion immediately adjacent to the surrounding flange 11, is provided with the diametrically opposed straight peripheral faces 17 and the flange 9 defining the central opening 10 at the inner end of the sleeve 6 is provided with the complemental straight edges or faces 18. These faces 17 and 18 provide means to hold the sleeves 6 and 8 against relative rotation one with respect to the other yet offer no hindrance or obstruction to the desired sliding telescopic engagement of the sleeve 8 within the sleeve 6.

It is important to have the locking of the sleeves 6 and 8 against relative rotation so that, when the hand nut 14 is turned to loosen or tighten the sleeve 8, such sleeve will not turn upon the shaft S but will remain axially locked with the sleeve 6 when the sleeve 6 is held by the fingers of one hand and the nut 14 turned by the other hand. It will be noted that the faces 17 are of lengths sufficient to allow the desired telescopic sliding coaction between the sleeves 6 and 8.

The tool, as herein embodied, is particularly adapted for use on shoe finishing machines having an edge trimmer. The shaft of the edge trimmer carries the trimmer or cutter T and guard G. As the shoe sole is held against the frontal face of the trimmer or cutter T, while such trimmer or cutter is revolving at a high speed, the frontal shape of the cutter teeth in the trimmer or cutter T are such that they must be partly guarded during the trimming operation to prevent undue trimming of the shoe sole or damage thereto.

The guard G is held on the shaft S by the hand nut 14 at the desired point on the shaft S according to the thickness of the shoe sole to be trimmed. This adjustment of the guard G on the shaft S must be such that the guard partly overlaps into the trimmer or cutter T sufficiently to partly guard the cutter teeth of the trimmer or cutter T and more especially the high points of the teeth.

The guard G is not altogether rigidly fixed on the shaft S but has a certain flexible movement in two parts as afforded by the sleeves 6 and 8 along the shaft so that, while one of such sleeves as 8, is fixedly held in desired position on the shaft S, the other sleve 6 can move back and forth lengthwise of the shaft within certain limitations and thus allow the guard G to adjust itself to the bottom surface of the shoe sole.

As there are various thicknesses of shoe soles, different sized trimmers or cutters must be used accordingly and, of course, requires changing of the trimmers or cutters from time to time which necessitates a new adjustment of the guard along the shaft S. A proper relation between the trimmer or cutter T and the guard G must be maintained at all times in accordance with the shoe sole being trimmed. To make such adjustment, the hand nut 14 is turned to loosen the sleeve 8 on the shaft S so that the sleeve can be moved along the shaft S in either direction to the point desired and then securely held in such position by tightening up the hand nut 14. The importance of this adjustment is so that the guard G shall be in just the right engagement with the trimmer or cutter and also the right amount of tension of the spring 7 is maintained upon the guard G and in turn upon the side surfaces of the shoe sole being trimmed. If the guard G is not close enough to the trimmer or cutter T, the spring 7 will fail to exert sufficient pressure to hold the shoe sole toward the outer edge of the trimming knife and the result would be an uneven or ununiform edge on the shoe sole. Furthermore, if the guard G should be set up too close to the trimmer or cutter T, then the welt side of the shoe sole would be trimmed away too much.

From the foregoing description it is thought to be obvious that a machine tool constructed in accordance with my invention is particularly well adapted for use by reason of the convenience and facility with which it may be assembled and operated.

I claim:

1. In an edge trimmer supported by a shaft, a trimmer guard comprising a guard member for coaction with the cutters of the trimmer, a spring chamber sleeve carried by the guard member at the inner side thereof, a holding sleeve telescoping within the spring chamber sleeve, an expansible spring within the chamber sleeve interposed between and bearing against the opposed ends of the guard member and holding sleeve, the outer portion of the holding sleeve being constructed to be contractible, and means for compressing said outer portion, the guard member, chamber sleeve, and holding sleeve surrounding the trimmer shaft, the outer portion of the holding sleeve when contracted clamping said holding sleeve to the trimmer shaft.

2. A trimmer guard as set forth in claim 1 wherein the inner extremity of the holding sleeve is provided with coacting means for limiting the extent of movement of the chamber sleeve and guard member with respect to the holding sleeve under the action of the spring.

3. A trimmer guard as set forth in claim 1 wherein the means for contracting the outer portion of the holding sleeve comprises a nut threaded on said outer portion, said outer portion being tapered and longitudinally split to provide clamping arms.

4. A trimmer guard as set forth in claim 1 wherein the guard member and the chamber sleeve are in threaded engagement.

5. A trimmer guard as set forth in claim 1 wherein the spring chamber sleeve and the holding sleeve are provided with coacting means to prevent the same having rotation one independently of the other.

ARTHUR C. NELSON.

REFERENCES CITED

The following references are of record in the file of this patent:

UNITED STATES PATENTS

| Number | Name | Date |
|---|---|---|
| 44,688 | Hodge | Oct. 11, 1864 |
| 1,656,554 | Brock | Jan. 17, 1928 |
| 1,737,351 | Bammer | Nov. 26, 1929 |